INVENTOR
RICHARD J. HANSON
BY *Edward W. Goebel*
HIS ATTORNEY

Dec. 23, 1969    R. J. HANSON    3,486,051
BASE CONSTRUCTION FOR DYNAMOELECTRIC MACHINES
Filed Aug. 22, 1968    3 Sheets-Sheet 3

INVENTOR
RICHARD J. HANSON
BY Edward N. Goebel
HIS ATTORNEY

United States Patent Office 3,486,051
Patented Dec. 23, 1969

---

3,486,051
BASE CONSTRUCTION FOR DYNAMOELECTRIC MACHINES
Richard J. Hanson, Erie, Pa., assignor to General Electric Company, a corporation of New York
Filed Aug. 22, 1968, Ser. No. 754,564
Int. Cl. H02k 5/20
U.S. Cl. 310—91                                    4 Claims

ABSTRACT OF THE DISCLOSURE

A dynamoelectric machine, e.g., an eddy current dynamometer, having a stator rotatably mounted in base-supported cradle bearings, has a built-up box-like base which supports and partially houses the machine, with the base being specially constructed to minimize vibrational problems in the range of rotational speeds of the machine and to provide for water cooling.

---

BACKGROUND OF THE INVENTION

This invention relates to dynamoelectric machines, and more particularly, to a novel base construction for such machines. This invention is illustrated and described hereinafter with particular reference to eddy current inductor type machines such as eddy current dynamometers, although many of its features are applicable to other types of dynamoelectric machines.

The basic components of the well-known inductor type eddy current dynamometer comprise relatively rotatable members, i.e., a stator and a rotor and an excitation coil which can be mounted on either member. The rotor is mounted on bearings, such as oil lubricated, hydrostatic bearings or other suitable bearings and is rotated by an external tested device such as an engine, the output of which is to be measured. The stator is cradled in suitable bearings as well, but is constrained against rotation by torque measuring means.

The base for mounting such a dynamoelectric machine typically comprises a hollow casting or fabrication forming a sump for drainage water which has been used to cool the machine, with the casting machined flat on top for mounting bearing-supported pedestals one at each end of the machine. These pedestals are bolted down or otherwise secured to the machined top surface of the casting. With such arrangements, undesirable vibrational problems are often encountered, especially at high speeds of rotation.

SUMMARY OF THE INVENTION

To eliminate the aforesaid vibrational problems, the dynamometer is mounted in suitable cradle bearings on a base preferably of built-up welded construction. End walls perpendicular to the axis of the machine support the cradle bearings at the ends of the stator, and these end walls are connected by side walls more or less parallel to the axis of rotation and forming with the end walls a sort of open-top box-like structure. To provide a stiff rigid framework having a minimum of vibration in the range of rotational speed for which the machine is designed, the box-like structure should be brace and strengthened. To this end interior walls form a more or less trough-like structure around the bottom of the stator, this structure having substantial vertical extent and also extending from end wall to end wall and from side wall to side wall with its end and side edges secured to these walls. Further stiffening is provided by a horizontal closure wall extending from end wall to end wall and from side wall to side wall at the bottom of the base, the lower part of the base thus collecting and discharging cooling water from the machine.

BRIEF DESCRIPTION OF THE DRAWINGS

The drawings show an embodiment of the invention in which the dynamoelectric machine comprises an eddy current dynamometer having two spinning discs which are mounted on the same rotor shaft and spin between separate sets of pole pieces. It will be understood that this embodiment is for purposes of example and is not to be construed as a definition of the limits of the invention, except as defined in the appended claims.

In the drawings.

DESCRIPTION OF PREFERRED EMBODIMENTS

Apart from the novel features of the invention that have already been mentioned in general terms in the preceding summary of the invention, the construction and arrangement of a dynamometer embodying the invention are similar to devices of this type known to the prior art, as will appear from the following description of preferred embodiments.

Figure 1:
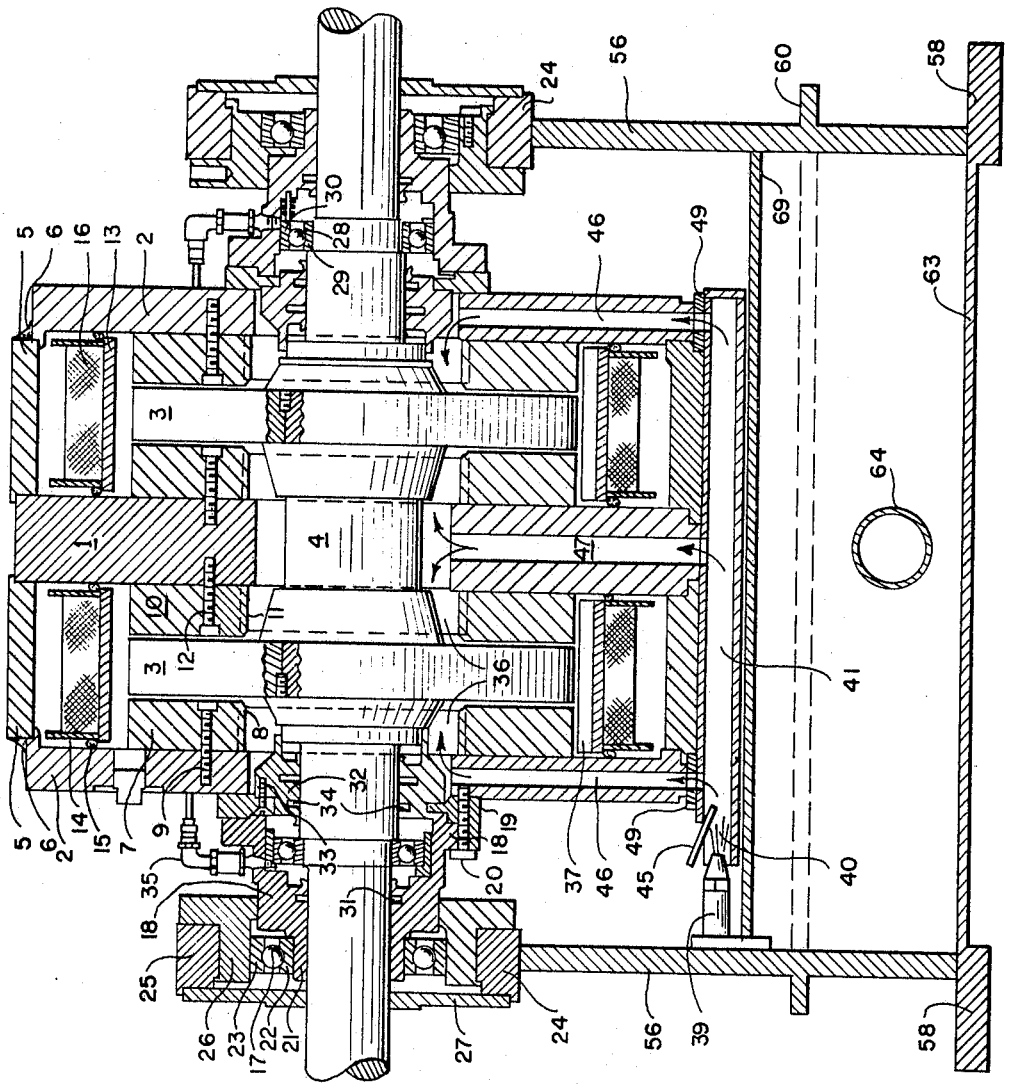
FIG. 1 is a longitudinal sectional elevation of a machine embodying the invention taken on line 1—1 of FIG. 2.
Figure 2:
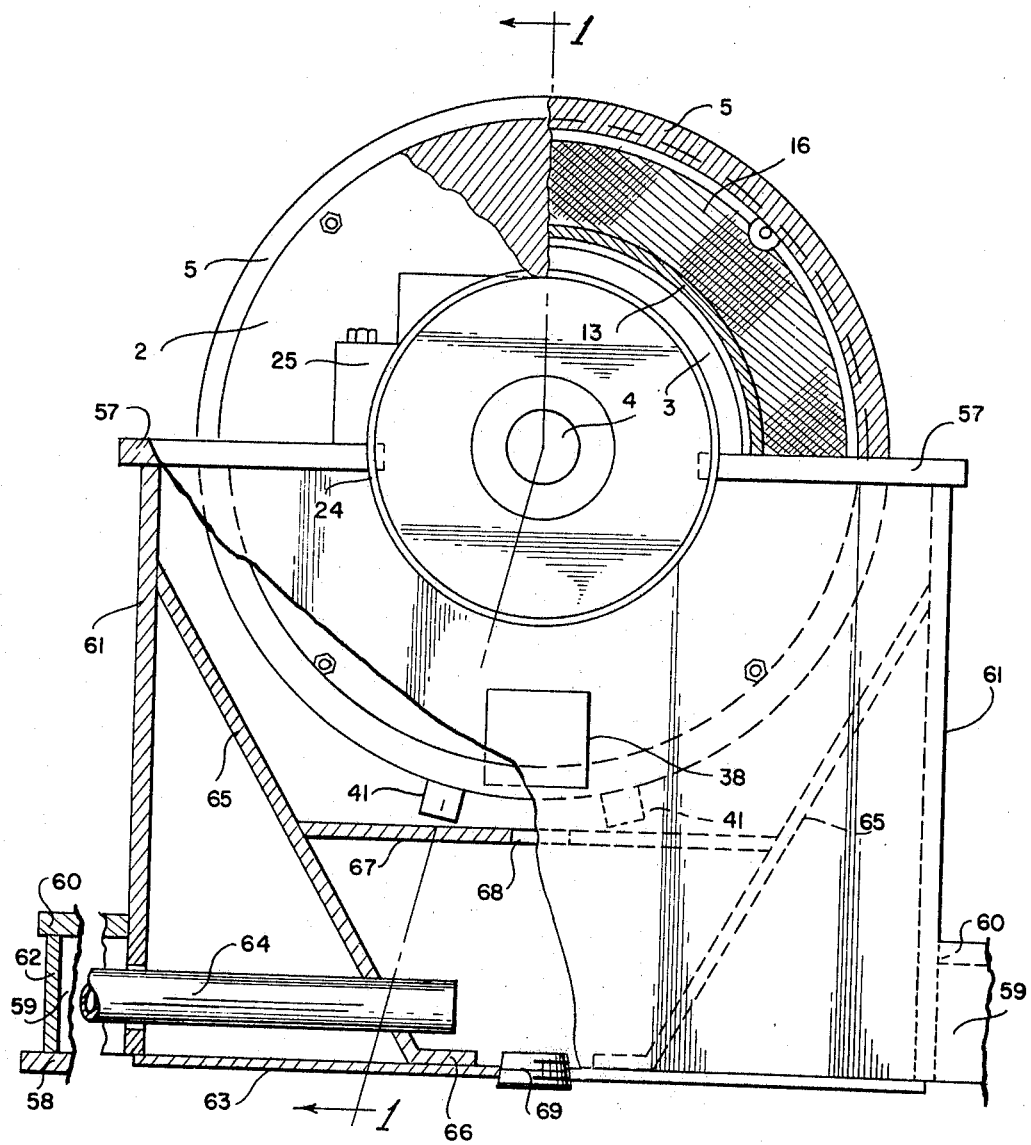
FIG. 2 is an end elevation of the machine, partially in section to show the base construction.

Referring first to FIGS. 1 and 2, the dynamometer stator is built up of parts that are assembled and welded together or otherwise secured together by means such as through bolts. In the form shown, there are three main parts of the stator casing or frame including a centrally located stator ring frame 1 and two end plates 2 forming between them two chambers in each of which there is a spinning disc 3. These discs are carried by and rotate with the shaft 4 which extends from end to end of the machine. One end of the shaft may be connected to and driven by an external machine to be tested. While a second external machine to be tested can be set up at the other end of the shaft, both ends of the shaft being adapted to be driven by tested machine. If desired, a tachometer can also be driven by the shaft, by means of a belt driven or other suitable apparatus.

The two chambers on opposite sides of the stator ring 1 are completed and enclosed circumferentially in any suitable manner as by means of cylinders 5, the inner edges of which fit against and are secured to the peripheral portion of the frame ring 1 in any suitable manner. The outer edges of the cylinders 5 engage the peripheral portions of the end plates 2 and are secured thereto in any suitable manner. Welding is indicated at 6 by way of example.

Each of the chambers encloses two sets or series of teeth or pole pieces arranged on opposite sides of the spinning disc 3. As shown, the pole pieces 7 of one set extend radially from and are integral with a supporting ring 8, this unitary structure being secured in any suitable manner to the adjacent end plate 2 as by means of screws 9. A similar set of pole pieces or teeth 10 and a supporting ring 11 are mounted on the stator ring frame 1 by means of screws 12. It will be understood that this arrangement is duplicated in the other disc chamber.

Excitation means are provided to establish a magnetic flux which passes through the frame and between the opposed pole pieces 7 and 10, traveling through the air gaps between the spinning discs 3 and pole pieces and creating eddy currents in the spinning disc inductors as will be understood by those skilled in the art. As shown, a supporting ring or cylinder 13 is located in each disc chamber surrounding the spinning disc 3, the supports 13 being positioned by virtue of being clamped between the stator ring frame 1 and the end plates 2. Flanges 14 project radially outward from the edges of each support 13 and preferably suitable gaskets 15 are located between the flanges 14 and the adjacent end plate 2 and stator frame 1. This construction provides a U-shaped annular channel for an excitation coil 16.

The stator of the machine is rotatably mounted in suitable cradle bearings here shown as ball bearings 17. To this end a trunnion structure 18 is secured to each end plate 2, or to a ring 19 integral therewith, by means such as screws 20. Each trunnion terminates in a nose 21 of reduced diameter which carries the inner race 22 of the ball bearing 17. The outer race 23 of the bearing is supported by the base construction hereinafter described, particularly by means of a half-ring support 24 and a cap 25, an adapter ring 26 being interposed between the support ring 24 and its cap 25 and the outer bearing race 23. The adapter ring makes it possible to adjust the position of the outer bearing race 23 circumferentially to compensate for wear. Preferably the end of the bearing supporting structure is closed by a suitable cover plate 27 secured by screws or the like to support ring 24 and cap 25.

The shaft 4 rotates inside the trunnion 18, 21 and is preferably supported in suitable bearings such as a ball bearing 28, the inner race 29 of which is mounted on the shaft and the outer race 30 of which is mounted inside the trunnion 18. Preferably the space around the bearing 28 is arranged for through circulation of oil for cooling and lubrication purposes. To enclose this space, the outer part of the trunnion structure is provided with a sealing groove or grooves 31 around the shaft 4; also the supporting ring 19, which forms part of the end plate 2, carries a suitable shaft seal 32 secured thereto by means such as screws 33 and provided with one or more sealing grooves 34 around the shaft 4. Oil is supplied to the space between the seals 31 and 34 by means such as oil supply pipe 35 and waste oil can be drained from the space in any desired manner.

It will be understood that in operation, the magnetic flux generated by the coil 16 passes through the frame parts and between the pole pieces 7 and 10, traversing the air gaps between these pole pieces and the disc faces of the spinning discs 3 and also passing through the discs and thus generating eddy currents in these inductors. As a result, the stator is subjected to a torque that tends to cause it to rotate in its cradle bearings 17. This rotation is restrained by suitable measuring means which give an indication of the torque generated by the external engine which drives the shaft 4.

The well known concomitant of such operation is that a large amount of heat is generated in the machine due to the induced eddy currents, and this heat must be absorbed and dissipated by suitable cooling means. Usually a cooling liquid such as water is circulated through such machines in contact with the areas which are apt to overheat. In the present instance, it is important to cool both faces of each spinning disc 3, as well as the adjacent faces of the pole pieces 7 and 10. For this purpose it is desired to provide a centrifugally moving film of cooling water distributed over each face of each spinning disc and moving between the disc and the adjacent pole pieces. Features of the described structure pertaining to providing a liquid cooling system for the spinning disc are more fully described and are claimed in a patent application filed on Aug. 22, 1968, in the name of James E. Bunner, Ser. No. 754,569, and assigned to the assignee of the present invention, which patent application is incorporated herein by reference.

As described in general terms in the summary, the machine thus far described is mounted in a base which supports the cradle bearings already mentioned and is specially arranged and constructed to have maximum stiffness and minimum vibration throughout the operating range of the machine. It is also preferred to build up this improved base from plate elements welded together in order to avoid the use of heavier and more expensive castings and machining operations, as well as to enable partition walls to be so placed as to provide maximum stiffness and rigidity.

Figure 3:
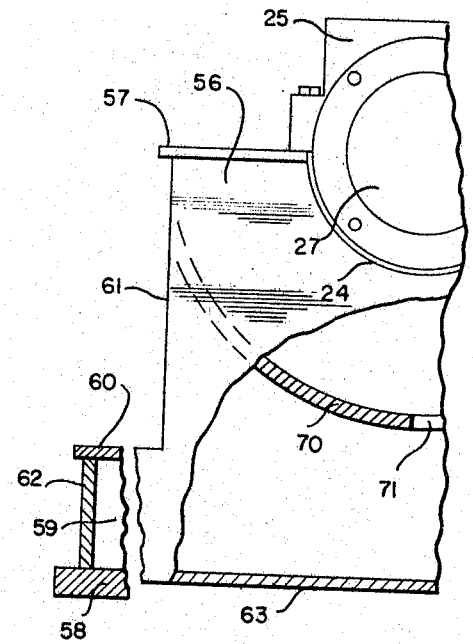
FIG. 3 is another partial end elevation, partially in section, which shows a different form of base.

In the form shown, referring to FIGS. 1 and 3, the base comprises two spaced and substantially parallel end walls 56, each of these end walls having welded to its upper edge one of the previously mentioned half-ring supports 24 for the cradle bearings 17. The upper edges of the end walls 56 have horizontal top plates 57 extending outwardly from the half ring bearing support 24 to the sides of the base and also cooperating with the bearing cap 25 which retains the adapter ring 26 and cradle bearing 17 in place.

As seen in FIG. 1, the end walls 56 are preferably of relatively heavy stock so as to carry the weight of the machine and they extend down to the bottom of the base where they are supported on foot pads 58. Preferably the ends walls 56 are also provided with extensions 59 (FIGS. 2 and 3) on one or both sides of the machine to support shelf-like extensions 60 on which auxiliary equipment can be maintained such as scales and the like.

At the sides of the base, the end plates 56 are connected by spaced vertical side plates 61 which extend between the end plates 56 above the level of the foot pads 58 thereof. Also at the edges of the shelf-like projections 60, lower side plates 62 extend between the extensions 59 and foot pads 58. The bottom of the base is completed by a bottom plate 63 which extends between the end plates 56 and between the side plates 61 so as to close up the base. The foot pads 58 can include holes therethrough to allow the whole dynamoelectric machine structure to be secured to the floor. Since drainage water collects in the base as described above, suitable draining means are provided such as a drain pipe 64 (FIG. 1).

It will be understood that a dynamometer supported in the cradle bearings 17 is approximately half enclosed within the open-topped box-like base formed of the side and end walls and the bottom wall described above. In order to strengthen and stiffen this framework against vibration at high speeds of rotation, additional partition walls are provided which preferably form a substantially trough-like structure extending underneath the bottom part of the machine. This trough structure extends from end wall to end wall of the machine and is suitably secured to the end walls, as by welding, so as to provide a much greater degree of longitudinal stiffening than would be provided simply by the end walls 56 and side walls 61, and also substantially greater than can be secured with the prior known construction in which a heavy base casting is machined to receive pedestals bolted to the base one at each end of the machine. Also the trough structure preferably extends from side wall 61 to side wall 61 so as to provide additional stiffening transverse to the axis of the machine. This arrangement also in effect funnels drainage water down to a suitable opening through which the water falls into the box-like base and is then drained by the pipe 64.

Referring to FIG. 2, the trough structure comprises inclined side walls 65, the upper edges of which are secured (e.g., by welding) to the side walls 61 and the end edges of which are likewise secured to the end plates 56 in a similar manner. These inclined partition walls 65 thus comprise longitudinal stiffening members, and by extending them down to the base plate 63 as indicated at 66, they provide vertical stiffening as well. The trough structure is completed by a horizontal partition 67 which extends between and has its end edges welded to the end walls 56, and which extends between the inclined partition walls 65 just below the stator structure with its side edges welded to these partition walls 65 so as to provide transverse stiffening. For draining water, either that from hoods 38 at the end of the machine or back flow from pressure box 41, the horizontal partition 67 is provided with a central opening 68 whereby drainage water collects in the bottom of the base from which it is drained out from pipe 64 already mentioned. As an alternative, a drain plug 69 can be provided in the extreme bottom of the base.

In FIG. 3, the trough structure of FIG. 2 is replaced by a single curved wall 70 which extends between and is welded at its ends to the end walls 56, and which has its side edges welded to the side plates 61. The cross sectional curve of the wall 69 is such as to carry it below the stator structure projecting downwardly into the casing, and the wall 70 is provided with a drain opening 71 whereby drainage water can escape to the bottom of the base as described above.

It will be understood by those skilled in the art that the several novel features of the invention described above can be embodied in mechanical constructions other than those illustrated and described by way of example.

What I claim as new and desire to secure by Letters Patent of the United States is:

1. In a dynamoelectric machine having a supporting base, a stator rotatably mounted in base-supported cradle bearings, and a rotor rotatable in bearings carried by the stator, an improved supporting base construction comprising a built-up welded plate structure including spaced parallel vertical end walls having thereon support rings for the cradle bearings at the ends of the stator, spaced parallel vertical side walls extending between said end walls and forming therewith an open-topped rectangular boxlike structure in which the lower part of the stator rotates, and stiffening means for said base construction comprising a trough-like structure extending under the stator from end wall to end wall with its edges engaging said side walls, the bottom of said trough-like structure having a drain opening for cooling water discharged from the dynamoelectric machine.

2. Improvements as defined in claim 1, a horizontal shelf-like wall extending outwardly from the lower edge of at least one side wall, said end walls having supporting extensions outwardly under the end edges of said shelf, and vertical closure means connected to the ends of said extensions and to the outer edge of said shelf.

3. Improvements as defined in claim 1, said trough-like structure comprising inclined bracing walls extending from end wall to end wall and from each side wall downwardly and inwardly to the bottom of said base construction, and a partition wall connecting said inclined bracing walls and said end walls at a level below the stator.

4. Improvements as defined in claim 1, said trough-like structure comprising a wall having an arcuate cross sectional shape to extend from the upper portions of said side walls downwardly underneath the stator mounted in said cradle bearings.

References Cited

UNITED STATES PATENTS

| | | | |
|---|---|---|---|
| 2,220,032 | 10/1940 | Winther et al. | 310—54 X |
| 2,374,028 | 4/1945 | Martin | 310—54 |
| 2,376,441 | 5/1945 | Martin | 310—54 X |
| 2,403,421 | 7/1946 | Winther | 73—134 X |
| 3,135,111 | 6/1964 | Roe | 73—134 |
| 3,303,368 | 2/1967 | Cohen et al. | 310—54 X |

WARREN E. RAY, Primary Examiner

U.S. Cl. X.R.

73—134; 310—54, 116, 268